Oct. 4, 1966 T. H. NICHOLL 3,277,358
BATTERY CHARGER
Filed Sept. 9, 1963
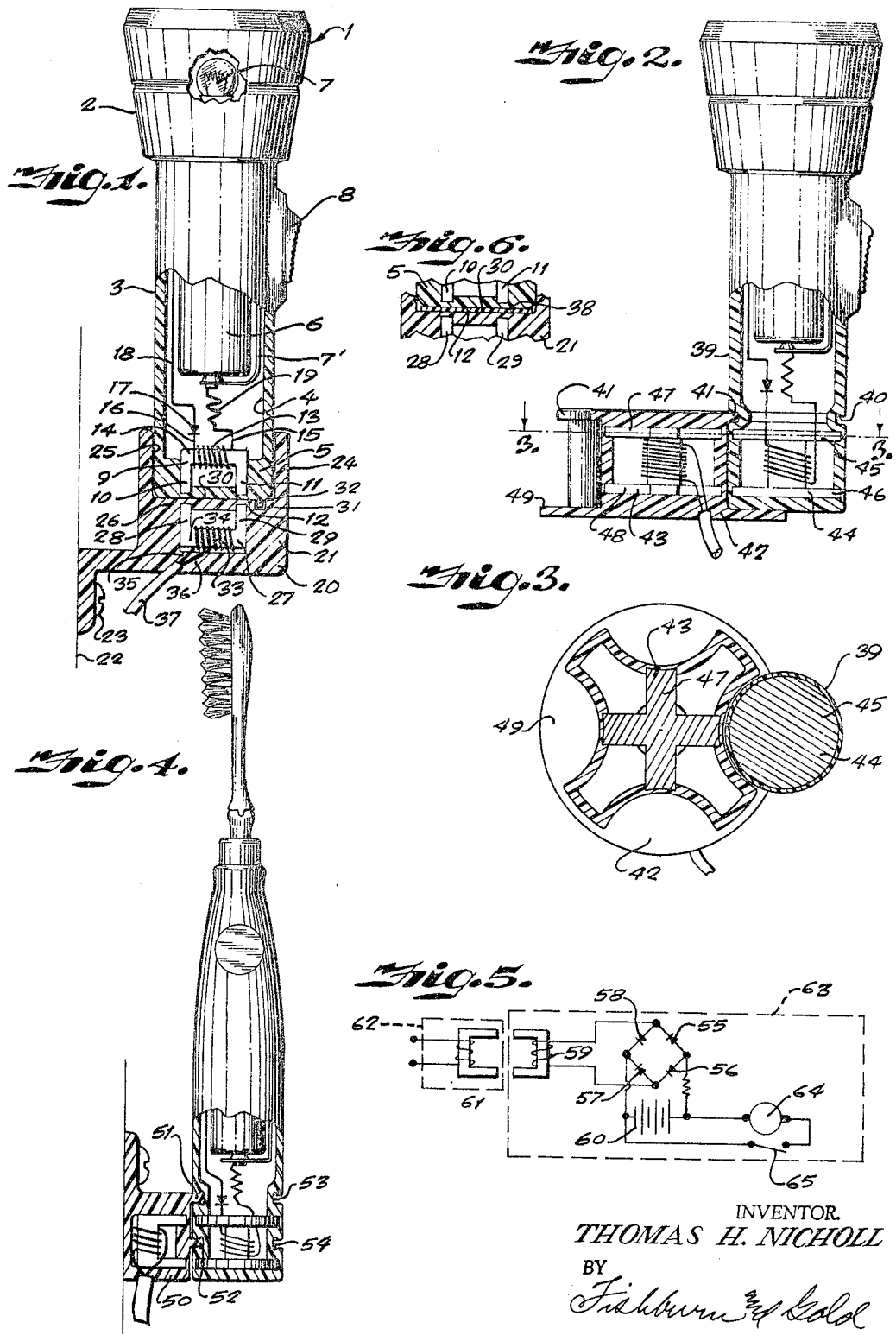
INVENTOR.
THOMAS H. NICHOLL
BY
Fishburn and Gold
ATTORNEYS

United States Patent Office 3,277,358
Patented Oct. 4, 1966

3,277,358
BATTERY CHARGER
Thomas H. Nicholl, 1204 W. 27th St., Kansas City, Mo.
Filed Sept. 9, 1963, Ser. No. 307,668
9 Claims. (Cl. 320—59)

This invention relates to devices for charging batteries and more particularly for charging the batteries of hand-held electrically powered appliances of the cordless type.

In recent years a large variety of cordless, relatively high power consumption hand-held electrical appliances have been developed. The practicality of these devices is dependent on the use of compact, efficient batteries usually contained within the appliance and adapted to be recharged during periods of non-use. The circuits for producing the recharging current have heretofore been either contained wholly within the appliance or within a bracket or stand into which the appliance is placed during non-use. In either case, however, it has been necessary to provide a physical electrical contact with the body of the appliance in order to feed the battery charging circuit or transfer the charging current to the appliance containing the battery. Such electrical contacts have been in the form of electrically conductive metallic strips, prongs, buttons or the like located on or exposed to the surface of the appliance body and having the disadvantages of shock hazard, corrosion and deposits interferring with electrical contact, rapid wear from continuous rubbing between the contacting surfaces and difficulties in manufacture.

The principal objects of the present invention are: to provide a battery charging arrangement for cordless electrical appliances which requires no physical electrical contact junction between the power source and the appliance; to provide such an arrangement wherein electrical contact surfaces are not exposed; to provide such a battery charging device wherein the electrical power is transmitted through non-electrically conductive materials by induction; to provide, in combination with a battery-operated electrical appliance, a mounting bracket containing electrical components for producing an alternating magnetic field externally thereof, to provide a battery containing appliance with electrical components therein and adapted to be excited by the bracket alternating field for producing a charging current for the appliance battery; to provide such a device wherein the charging rate can be varied by varying the distance between the power transferring components; and to provide such a battery charging arrangement which permits ease in hermetically sealing the appliance body, eliminates electrical charging contact corrosion problems, avoids the need for covering caps for exposed electrical contact prongs or the like, does not require accurate alignment for electrical charging coupling, and is inexpensive to produce and more reliable in use than conventional battery charging systems.

Other objects and advantages of this invention will become apparent from the following description taken in connection with the accompanying drawings wherein are set forth by way of illustration and example certain embodiments of this invention.

FIG. 1 is a side elevational view of a flashlight temporarily mounted on a battery charging wall bracket with portions broken away showing electrical components within the bracket and flashlight for producing an induced electrical coupling therebetween.

FIG. 2 is a side elevational view of a modified form of flashlight and bracket wherein the bracket is adapted to simultaneously support and charge a plurality of the flashlights.

FIG. 3 is a cross-sectional plan view through the modified form of flashlight and bracket taken on the line 3—3, FIG. 2.

FIG. 4 is a side elevational view of a battery-operated toothbrush and a bracket supporting and charging same with portions broken away to show a modified structure for engagement therebetween.

FIG. 5 is a schematic wiring diagram of a modified charging bracket and battery containing appliance illustrating a circuit supplying full wave current rectification for charging the battery.

FIG. 6 is a fragmentary cross-sectional view illustrating the placement of a magnetically insensitive spacer between the flashlight and bracket of FIG. 1 separating same for reducing the power transfer rate therebetween.

Referring to the drawings in more detail:

The reference numeral 1, FIG. 1, generally indicates a hand-held electrical appliance, in the illustrated example a flashlight 2 having a body 3 with a hollow interior 4. The body 3 is fabricated of a suitable non-electrically or magnetically conductive plastic resin and includes a lower portion 5. The flashlight 2 is powered during use by a suitable rechargeable battery 6 contained within the body 3 and is selectively electrically connected to the light bulb 7 of the flashlight by a wire 7' through a thumb-operated switch 8 in a conventional manner.

The body 3 has an electromagnetic core 9 imbedded therein adjacent the lower portion 5. The electromatic core 9, in the illustrated example, is of inverted U shape and is preferably of laminated soft iron construction to restrict hysteresis loss The legs 10 and 11 of the core 9 terminate near the bottom surface 12 of the lower portion 5 but no part thereof is exposed to the exterior of the body 3. An electrically conductive wire coil 13 is contained within the body 3 and surrounds or is looped around the web or leg connecting portion 14 of the electromagnetic core 9. The coil 13 is composed of a suitable number of turns for producing the desired electrical potential across the leads 15 and 16 thereof under the existing magnetic flux conditions and charging load. The lead 16 has a siutable rectifier 17 connected thereto for limiting the current in the battery connected lead 18 to a single direction for charging the battery 6. The lead 15 is connected in series to the opposite pole of the battery 6 from that of the lead 18 through a resistor 19 for limiting the charging current to the desired amount.

The flashlight 2 is illustrated as mounted on or resting in a bracket or current supply station 20 having a body 21 formed of a suitable non-conductive non-magnetic plastic resin and secured to a suitable wall or other support 22 by a screw 23. The bracket 20 includes an upstanding wall portion or lip 24 forming a cavity 25 for conveniently periodically receiving the lower portion 5 of the flashlight 2. When the flashlight 2 is received in the cavity 25 the bottom surface 12 thereof rests against or adjacent a non-magnetic and electrically non-conductive portion 26 of the bracket 20.

An electromagnetic core 27 is imbedded within the bracket body 21 and is of upstanding U shape having legs 28 and 29 terminating within the portion 26 adjacent the upper surface 30 thereof. The bottom surface 12 of the flashlight normally rests against the surface 30 when the bracket 20 is in use. The core 27 is completely contained within the bracket body 21 and no part thereof is exposed although the legs 28 and 29 preferably terminate closely adjacent the upper surface 30. A suitable recess 31 is contained in the body 21 extending downwardly from the surface 30 for receiving a suitable pin or the like 32 extending downwardly from the bottom surface 12 for conveniently aligning the flashlight 2 with the bracket 20. The legs of the flashlight core 9 will thereby rest in the most advantageous position with respect to the legs of the bracket core 27 for an efficient induction coupling although the respective cores remain out of actual physical contact.

An electrically conductive wire coil 33 is contained within the bracket body 21 and loops about or surrounds the connection portion or web 34 of the bracket core 27. The coil 33 has leads 35 and 37 extending through and externally of the bracket 20 and connected to a suitable source 37 of alternating current for producing an alternating magnetic field which radiates or extends externally of the bracket 20 but primarily within the cavity 25 by virtue of the positions of the core legs 28 and 29. The coil 33 acts as a transformer primary coil and the coil 13 at the secondary coil whereby when the appliance or flashlight 2 is in charging position alternating current in the primary coil induces a current in the secondary coil for use in charging the battery.

By way of operation when the flashlight 2 is supported by the bracket 20 as shown in FIG. 1, a magnetic coupling is formed between the cores 9 and 27 which permits the transfer of energy from the alternating current source 37 to the coil leads 15 and 16 without any physical contact between electrical conducting surfaces on the bracket and flashlight. As noted above the rectifier 17 permits only uni-directional current to reach the battery 6 and the resistor 19 limits the current to a desirable amount to prevent battery damage. To use the flashlight it is merely lifted from the bracket 20 whereupon the magnetic coupling is broken and the rectifier 17 functions only to prevent battery drain until replacement of the flashlight in the bracket.

Due to the lack of exposed contacting surfaces on the flashlight 2 and the bracket 20, these items may be easily hermetically sealed during fabrication for operation under adverse conditions such as high humidity and/or corrosion promoting atmospheres. The lack of physical electrical contact also avoids the possibility of arcing and/or overheating at the contact junction as well as the possibilty of failure to make contact altogether and need for protective caps.

It is to be understood that the coils, cores, resistor and rectifier are selected in value and designed for optimum performance which takes into account the spacing between the respective cores and the characteristics of the battery. If desired, the various components may be designed so that the resistor is eliminated from the circuit. Referring to FIG. 6, if it is desired to reduce the charging current to the battery, for example during long periods of non-use, a suitable non-magnetic non-conductive spacer 38 may be placed between the bottom surface 12 and upper surface 30 to separate the respective cores 9 and 27 a distance greater than the normal spacing illustrated in FIG. 1.

Referring to FIG. 2, a modified form of flashlight and bracket is depicted wherein the flashlight body 39 has a circumferential groove 40 adapted to receive one semi-circular outwardly projecting lip or rim portion 41 on the bracket 42 for supporting the flashlight in magnetic coupling engagement between the bracket core 43 and the flashlight core 44. In the embodiment of FIG. 2 the flashlight core 44 is in the shape of a spool having an upper disc 45 separated from a lower disc 46 whereupon the flashlight may be rotated into any rotational position on the longitudinal axis thereof and still make the same magnetic flux engagement with the bracket core 43.

The bracket core 43 has an upper portion 47 and a lower portion 48 each in the form of a cross with respective legs terminating adjacent one of the respective semi-circular rim portions 41. In the illustrated example there are four rim portions 41 permitting the bracket 42 to support and charge four flashlights 39 simultaneously if desired. The bracket 42 includes a circular base 49 upon which the bottom of the respective flashlight 39 may rest during charging.

A further modification of this invention is illustrated in FIG. 4 wherein a bracket 30 has a pair of spaced apart projections 51 and 52 adapted to be respectively received in snap fashion into spaced apart annular grooves 53 and 54 surrounding, in this example, the body of an electrically operated cordless toothbrush.

The embodiments of FIGS. 1, 2 and 4 have been illustrated as containing circuits for half-wave current rectification, however, if desired full-wave rectification may be obtained by using a circuit such as illustrated by the schematic wiring diagram of FIG. 5. Referring to FIG. 5, recifiers 55, 56, 57 and 58 are connected in the well-known "bridge" relationship across the leads of the appliance coil 59 and battery 60 to provide full-wave rectification of the alternating current produced across the coil 59 by the alternating current in the bracket coil 61. In FIG. 5 the bracket is depicted by the broken lines 62 and the battery operated appliance is represented by the broken lines 63. The appliance load is depicted at 64 and the operating switch therefor is labeled 65.

It is to be understood that while certain forms of this invention have been illustrated and described they are not to be limited to the specific forms or arrangements of parts herein described and shown except insofar as such limitations are included in the claims.

What I claim and desire to secure by Letters Patent is:

1. In combination with an electrical appliance having a body with an electrically non-conductive non-magnetic portion, said appliance being powered by a rechargeable battery, apparatus for recharging said battery comprising; a mounting bracket having a non-magnetic electrically non-conductive portion and adapted to removably engage said body for maintaining said bracket portion adjacent said body portion, said mounting bracket having an electromagnetic core mounted therein with a pole thereof adjacent said bracket portion, an electrically conductive wire coil contained within said bracket and surrounding at least part of said bracket core, means for impressing alternating current on said bracket coil for producing an alternating magnetic field, said body having an electromagnetic core mounted therein with a pole thereof adjacent said body portion, an electrically conductive wire coil contained within said body and surrounding at least part of said body core and electrically connected to said battery, and at least one rectifier electrically connected between said body coil and battery permitting only substantially unidirectional current to flow through said battery from said body coil, whereby on positioning of said body portion adjacent said bracket portion with the poles of the respective cores aligned the said body portion and bracket portion separate said poles and the current in the bracket coil produces a charging current in said body coil and battery without physical electrical contact between said bracket core and said body core.

2. In a rechargeable battery powered appliance comprising, a load member, a body having a wall enclosing said load member, a rechargeable battery and a rectifier and a transformer secondary coil and core therein, all positioned in said body and enclosed by said wall, a current supply station having a transformer primary coil and a core therein with said primary coil connected to a source of current supply, a station body having a wall enclosing said primary coil and core, said station body and appliance body having cooperating wall portions for engagement in positioning the appliance in battery recharging position, said primary coil and core and secondary coil and core being arranged in the respective bodies so that the cores are aligned and said cooperating wall portions are therebetween when said wall portions are engaged, said cooperating wall portions each being electrically non-conductive and non-magnetic, an electric circuit connecting the secondary coil, rectifier and battery, with the rectifier between said coil and battery for supplying substantially only unidirectional current from the secondary coil to the battery when in recharging position, and a switch controlled circuit connecting the battery to the load member for energizing same when the switch is in circuit making position.

3. The combination as set forth in claim 2 wherein said station body and the coil core therein removably receive a plurality of said appliances simultaneously for charging the batteries thereof.

4. The combination as set forth in claim 2 wherein said cores and coils are unexposed externally of said respective appliance and station bodies.

5. The combination as set forth in claim 2 wherein a plurality of rectifiers are connected in bridge relation between said secondary coil and said battery for obtaining full-wave rectification of the charging current and limiting battery drain to the secondary coil when the appliance is separated from the current supply station.

6. The combination as set forth in claim 2 including means for varying the separation between said primary core and said secondary core for varying the induced power transformer therebetween.

7. The combination as set forth in claim 2 wherein one of said station and appliance body portions includes a groove and the other includes a lip adapted to be received in said groove for supporting said appliance body by said station and aligning the cores of the transformer primary and secondary.

8. A structure as set forth in claim 2 wherein a resistor is in the circuit of the rectifier and battery for limiting the charging current applied to said battery.

9. A structure as set forth in claim 8 wherein the body walls of the station and the appliance are of plastic and enclose the respective transformer primary and secondary and prevent contact of the user therewith.

References Cited by the Examiner

UNITED STATES PATENTS

| | | | |
|---|---|---|---|
| 1,967,801 | 7/1934 | Woodbridge | 320—2 X |
| 2,029,628 | 2/1936 | Lord | 320—59 X |
| 2,415,688 | 2/1947 | Hall | 219—246 |
| 2,967,267 | 1/1961 | Steinman et al. | 317—101 |
| 2,982,849 | 5/1961 | Volkerling et al. | 320—2 X |
| 3,191,136 | 6/1965 | Connell et al. | 336—84 |

JOHN F. COUCH, *Primary Examiner.*

LLOYD McCOLLUM, *Examiner.*

S. WEINBERG, *Assistant Examiner.*